United States Patent [19]

Nash

[11] Patent Number: 4,961,608

[45] Date of Patent: Oct. 9, 1990

[54] SUN VISOR INCORPORATING A SLIDABLE MIRROR

[75] Inventor: Douglas H. Nash, Alvechurch, England

[73] Assignee: Austin Rover Group Limited, United Kingdom

[21] Appl. No.: 343,518

[22] Filed: Apr. 26, 1989

[30] Foreign Application Priority Data

Apr. 30, 1988 [GB] United Kingdom ................. 8810350

[51] Int. Cl.$^5$ ........................... B60J 3/00; B60R 1/12
[52] U.S. Cl. .................................... 296/97.5; 350/632
[58] Field of Search ........................... 296/97.5, 97.1; 160/DIG. 3, 370.2; 350/632

[56] References Cited

U.S. PATENT DOCUMENTS

| 4,103,860 | 8/1978 | Haas et al. | 296/97.5 X |
| 4,421,355 | 12/1983 | Marcus | 296/97.5 |
| 4,521,051 | 6/1985 | Cody et al. | 296/97.5 |
| 4,653,798 | 3/1987 | White et al. | 296/97.5 |
| 4,685,723 | 8/1987 | Canadas | 296/97.5 |
| 4,711,483 | 12/1987 | Gulette et al. | 296/97.5 |

FOREIGN PATENT DOCUMENTS

| 53663 | 6/1982 | European Pat. Off. | 296/97.5 |
| 3324169 | 1/1985 | Fed. Rep. of Germany | 296/97.5 |
| 2483858 | 12/1981 | France | 296/97.5 |

Primary Examiner—Margaret A. Focarino
Assistant Examiner—Andrew C. Pike
Attorney, Agent, or Firm—Davis, Bujold & Streck

[57] ABSTRACT

A sun visor is disclosed having a frame covered by trim material 9 and a mirror 2 slidingly supported by a cassette assembly 20 which is attached to the frame. The cassette assembly comprises a cover member 8 and a base member 7 snapfitted together by means of integrally formed latching means 14, 13. The mirror 2 is moveable from a first position where it is viewable through respective apertures 4, 4A in the trim material 9 and the cover member 8 to a second position where it is hidden from view.

13 Claims, 1 Drawing Sheet

SUN VISOR INCORPORATING A SLIDABLE MIRROR

This invention relates to a sun visor and in particular to a sun visor for a motor vehicle having a vanity mirror.

It is known from EP-A-0053663 to provide a sun visor with a mirror that is slidable from a viewing position to a stored position where it is not visible.

It is an object of this invention to provide an improved sun visor of simpler construction.

According to the invention there is provided a sun visor comprising a frame, trim material covering the frame, a cassette assembly attached to the frame and a mirror slidingly supported by the cassette assembly, the cassette assembly having a cover member and a base member snap-fitted together wherein the mirror assembly is moveable from a first position where it is viewable through respective apertures in the trim material and cover member to a second position where it is hidden from view.

The invention will now be described by way of example with reference to the accompanying drawings of which:

With reference to the figures there is shown a sun visor 1 having a moulded frame (not shown) which is covered in a trim material 9.

Figure 1:
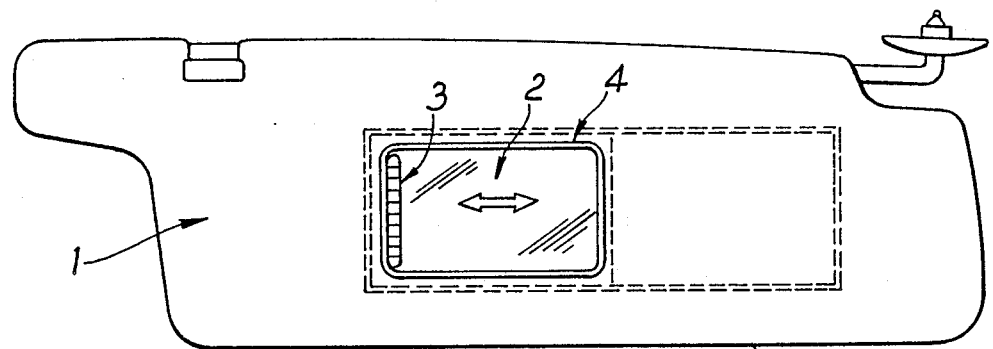
FIG. 1 is a plan view of a sun visor according to the invention.

A mirror 2 is shown in FIG. 1 in a viewing position where it may be viewed through an aperture 4 in the trim material 9.

Figure 2:
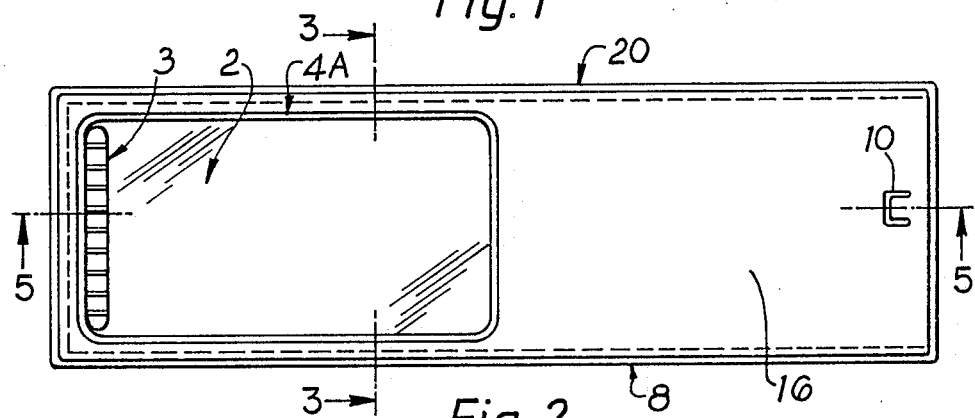
FIG. 2 is a plan view of a mirror cassette assembly forming part of the sun visor of FIG. 1.
Figures 3, 4:
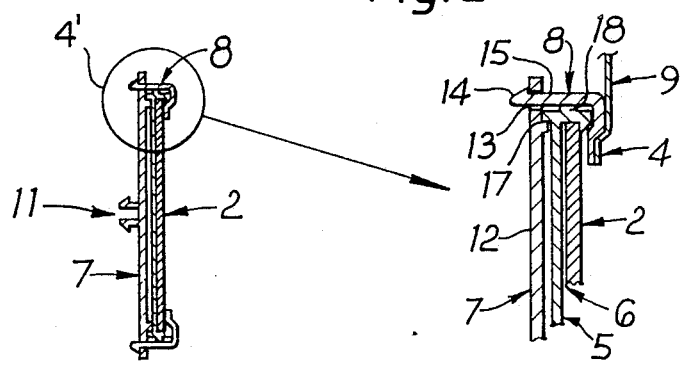
FIG. 3 is a cross section on the line 3—3 in FIG. 2.
FIG. 4 is an enlarged view of the cross section of FIG. 3 in the region defined by circle 4.
Figure 5:
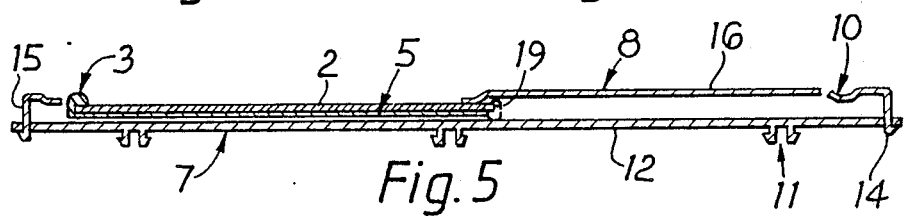
FIG. 5 is a cross section on the line 5—5 in FIG. 2.

The mirror 2 is slidable from the viewing position to a stowed position in which it is not visible by moving the mirror 2 to the right as shown in FIGS. 1 and 2. The mirror 2 is bonded to the front face of a support frame 5 by means of adhesive 6. Substantially the entire rear face of the mirror 2 is bonded to the frame 5 so that in the event of the mirror being fractured substantially all of the fragments will remain attached to the frame 5.

The support frame 5 is moulded from a plastics material and has a finger grip 3 formed integrally on one end, a detent lobe 19 formed integrally at the other end, a number of integrally formed springs 18 and two runners 17 each extending longitudinally along the rear face of the support frame 5 adjacent to a longitudinal edge of the support frame 5.

The support frame 5 is slidably mounted in a cassette assembly 20.

The cassette assembly 20 comprises a substantially flat base member 7 and a cover member 8 which are snap-fitted together.

The cover member 8 has a substantially flat central portion 16 the peripheral edge of which is turned up to form a boundary wall 15.

The flat central portion has a resilient tab 10 integrally formed near one end and an aperture 4A of substantially the same dimensions as the aperture 4 near the other end.

Upon assembly of the sun visor the apertures 4 and 4A re aligned and the trim material 9 and the cover member 8 are secured together by welding around the apertures 4, 4A.

The boundary wall 15 has a number of latching members 14 formed integrally therewith for engagement with respective (third) apertures 13 in the base member 7 to secure the base and cover members 7 and 8 together.

The rear face 12 of the base member 7 has a number of resilient latching means 11 formed on it for attaching the cassette assembly 20 to the frame of the sun visor 1.

When fully assembled the support frame 5 is located between the base member 7 and the cover member 8, the runners 17 being in contact with the base member 7 and the springs 18 being in contact with the boundary wall 15.

The springs 18 supply sufficient force to prevent rattling of the frame in the cassette assembly 20 without unduly increasing the frictional resistance to sliding between the support frame 5 and the cover and base members 8 and 7.

When the mirror 2 and support frame 5 are slid into the stowed position the detent lobe 19 engages with the resilient tab 10 thereby retaining the mirror and support frame 2 and 5 in the stowed position.

It will be appreciated by those skilled in the art that various modifications could be made without effecting the inventive merits of this invention. For example a second resilient tab could be provided to retain the mirror in the viewing position or the springs could be used to provide a frictional resistance to sliding to help maintain the mirror in the viewing position.

I claim:

1. A sun visor comprising:
a moulded frame,
trim material covering the moulded frame and defining a first aperture in a surface of the visor, a cassette assembly attached to the moulded frame, and a mirror slidingly supported within the cassette assembly, the cassette assembly having a cover member and a base member, the cover member defining a second aperture aligned with said first aperture and having a number of latching members formed integrally therewith for engagement with respective third apertures defined by the base member to enable the base member and the cover member to be snap-fitted together, wherein the mirror is slidable from a first position in which it is viewable through said first and second apertures in the trim material and in the cover member, respectively, to a second stowed position where it lies behind the cover member and the trim material and is thus hidden from view.

2. A sun visor as claimed in claim 1 in which the cassette assembly further comprises a support frame.

3. A sun visor as claimed in claim 2 in which the mirror is adhesively bonded over substantially an entire rear face thereof to the support frame.

4. A sun visor as claimed in claim 3 in which spring means are formed as an integral part of the support frame for the mirror to prevent rattling of the support frame in the cassette assembly.

5. A sun visor as claimed in claim 4 in which detent means are formed as an integral part of the cover member to retain the mirror and the support frame in the stowed position.

6. A sun visor as claimed in claim 3 in which detent means are formed as an integral part of the cover member to retain the mirror and the support frame in the stowed position.

7. A sun visor as claimed in claim 2 in which spring means are formed as an integral part of the support frame for the mirror to prevent rattling of the support frame in the cassette assembly.

8. A sun visor as claimed in claim 7 in which detent means are formed as an integral part of the cover member to retain the mirror and the support frame in the stowed position.

9. A sun visor as claimed in claim 7 in which a finger grip is formed as an integral part of the support frame.

10. A sun visor as claimed in claim 2 in which detent means are formed as an integral part of the cover member to retain the mirror and the support frame in the stowed position.

11. A sun visor as claimed in claim 10 in which a finger grip is formed as an integral part of the support frame.

12. A sun visor as claimed in claim 2 in which a finger grip is formed as an integral part of the support frame.

13. A sun visor comprising:
a moulded frame;
trim material covering the moulded frame and defining a first aperture in a surface of the visor, a cassette assembly attached to the moulded frame, and a mirror slidingly supported within the cassette assembly, the cassette assembly having a cover member and a base member, the cover member defining a second aperture aligned with said first aperture and having a number of latching members formed integrally therewith for engagement with respective third apertures defined by the base member to enable the base member and the cover member to be snap-fitted together, wherein the mirror is slidable from a first position in which it is viewable through said first and second apertures in the trim material and in the cover member, respectively, to a second stowed position where it lies behind the cover member and the trim material and is thus hidden from view;
the cassette assembly further comprises a support frame;
spring means are formed as an integral part of the support frame for the mirror to prevent rattling of the support frame in the cassette assembly;
detent means are formed as an integral part of the cover member to retain the mirror and the support frame in the stowed position; and
a finger grip is formed as an integral part of the support frame.

* * * * *

UNITED STATES PATENT AND TRADEMARK OFFICE
CERTIFICATE OF CORRECTION

PATENT NO. : 4,961,608

DATED : October 9, 1990

INVENTOR(S) : Douglas H. Nash

It is certified that error appears in the above-identified patent and that said Letters Patent is hereby corrected as shown below:

Column 3, line 23, change "frame;" to --frame,--.

Signed and Sealed this

Fourth Day of August, 1992

Attest:

DOUGLAS B. COMER

*Attesting Officer*   Acting Commissioner of Patents and Trademarks